May 7, 1935.  C. J. WILLIAMSON ET AL  2,000,367
AUTOMATIC VALVE CONTROL SYSTEM
Filed July 3, 1933  3 Sheets-Sheet 1

Inventors
Colonel J. Williamson
Herbert F. Schwerkrup
By Lyon & Lyon
Attorneys

May 7, 1935.  C. J. WILLIAMSON ET AL  2,000,367
AUTOMATIC VALVE CONTROL SYSTEM
Filed July 3, 1933  3 Sheets-Sheet 3

Inventors
Colonel J. Williams
Herbert F. Suverkrup
By Lyon & Lyon
Attorneys

Patented May 7, 1935

2,000,367

UNITED STATES PATENT OFFICE 2,000,367

AUTOMATIC VALVE CONTROL SYSTEM

Colonel J. Williamson and Herbert F. Suverkru$_\text{p}$, San Bernardino, Calif.

Application July 3, 1933, Serial No. 678,856

4 Claims. (Cl. 161—7)

This invention relates broadly to a system for automatically opening and closing valves and is particularly useful in connection with sprinkler systems for supplying water to different sprinkler lines for a predetermined time each day, every other day, or at longer or shorter intervals, as desired.

In arid and semi-arid regions where lawns, gardens, etc., must be artificially watered, permanent sprinkler systems are widely used to spray water over relatively large areas of ground. With these sprinkler systems the only manual act required is the opening and closing of the valves supplying water to the different sprinkler lines. However, in order to use the water to the best advantage, it should be applied at regular intervals and for a definite length of time. When the operation of the system is under the direct control of a human being, it is seldom conducted in a manner to yield the best results. Thus, the operator may forget to sprinkle at all on some days, or may sprinkle for too long or too short a period. Where the sprinkling is done by the occupant of the premises, it may become a nuisance task, particularly when there are many sprinkler lines which must be turned on successively. Several different sprinkler lines are usually necessary because the available flow of water is seldom sufficient to properly operate all of the sprinkler units simultaneously.

In accordance with the present invention, direct manual control of the sprinklers is avoided by providing a valve mechanism electrically operated under the control of a clock for automatically opening and closing the valves in the sprinkler lines. This practically entirely eliminates the human errors mentioned and utilizes the available water to maximum advantage. In addition, it makes practicable the operation of the sprinklers during the night, when more water may be available and when the water is most completely absorbed by the ground, or during periods when the occupants of the premises are absent.

A broad object of the invention is to provide a practicable system for automatically opening a valve at predetermined relatively long intervals, maintaining it open for a predetermined adjustable short period, and then closing it.

Another object is to provide a practicable system for successively opening and closing a plurality of valves, whereby only one valve is open at a time but each valve is periodically opened (at relatively long intervals) for a predetermined relatively short interval and then closed.

Another object is to provide a simple and compact assembly of a plurality of valves with means for opening the valves automatically in response to control from a remote point but with additional means for opening the valves manually independently of the automatic means.

Another object is to provide a novel ratchet wheel mechanism for automatically and positively rotating a valve control shaft by small increments in response to reciprocating motion produced by a solenoid.

Still another object is to provide a practical control clock for delivering electrical impulses in trains, in which the impulses in each train occur at relatively short adjustable intervals and in which the trains occur at relatively long adjustable intervals.

Other objects and features of the invention will be apparent from the following detailed description of a preferred embodiment of the invention.

Figure 1:
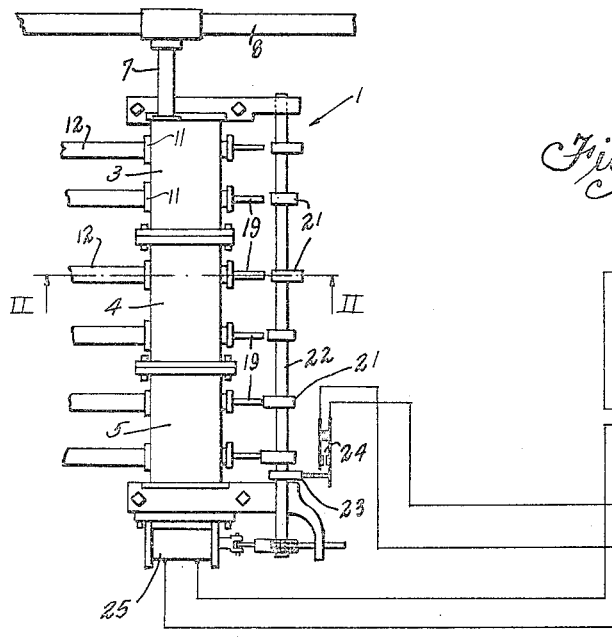
Fig. 1 is a schematic diagram of a complete system in accordance with the invention.

Referring to Fig. 1, our system comprises a valve unit designated generally at 1, together with a clock control mechanism which may be located at a point remote from the unit 1 and is designated generally at 2.

The valve unit consists of a manifold which may be formed in several sections 3, 4 and 5 respectively, sections 3 and 5 being end sections and section 4 being an intermediate section. Each section includes two valves, the structure of each of which is shown in detail in Fig. 2.

Figure 2:
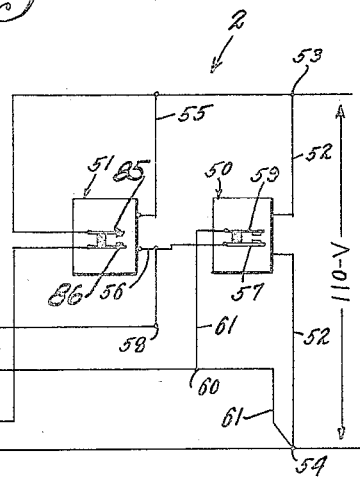
Fig. 2 is a cross sectional view in the plane II—II of Fig. 1, showing the construction of one of the valve units.

Thus referring to Fig. 2, each section of the manifold comprises a casting having a longitudinal passage 6 extending therethrough from end to end. In the intermediate section 4 (of which there may be several although only one is shown in Fig. 1), this passage extends through the end walls of the section and connects with the corresponding passages in the adjoining sections. The outer end of the passage in the end section 5 is sealed by a solid end wall and the outer end of the passage 6 in section 3 terminates in a threaded opening adapted to be connected by a nipple 7 to a water main 8. Thus water under pressure from the main 8 is supplied at all times to the manifold 6 extending through the three sections 3, 4 and 5.

Two seats 9 are provided in each section of the valve assembly, which seats define openings leading from the manifold 6 into separate passages 10 which may be connected by threaded connections as shown at 11 with pipes 12 extending to different sprinkler lines. Communication between the manifold 6 and each of the passages 10 is normally blocked by a valve 13 which is constantly urged against the seat 9 by a spiral spring 14. Each valve 13 may be provided with a washer 15 of rubber or other resilient material to form a fluid-tight joint against the seat. Each valve is opened by forcing it to the left against the pressure of its associated spring 14 and to guide the valve in its opening and closing movement it is provided with a pin 16 sliding in a recess 17 and with guide members 18 which slide along the inner surface of the valve opening. To force the valves to the left and thereby open them, a push rod 19 is mounted opposite each valve, this push rod passing through the wall of the manifold casting and being sealed by packing 20.

As shown in Fig. 1, the push rods 19 associated with the different valves are arranged in alignment whereby they may be actuated by cams 21 on a common cam shaft 22 which is rotatably supported at opposite ends by bearings mounted upon the valve casing. The cams 21 are preferably oriented differently about the cam shaft 22 so that as the shaft is rotated by small increments, the different cams 21 successively depress the different push rods 19. The orientation of the cams is such, however, that in at least one position of the shaft all of the valves are closed. In addition, an auxiliary cam 23 is provided on shaft 22 which actuates a pair of electrical contacts 24. Cam 23 is so oriented that it opens the contacts 24 when shaft 22 is in its normal position of rest, in which none of the push rods 19 are depressed by their associated cams. In all other positions of the shaft 22, the cam 23 releases the contacts 24, permitting them to close.

Figure 3:
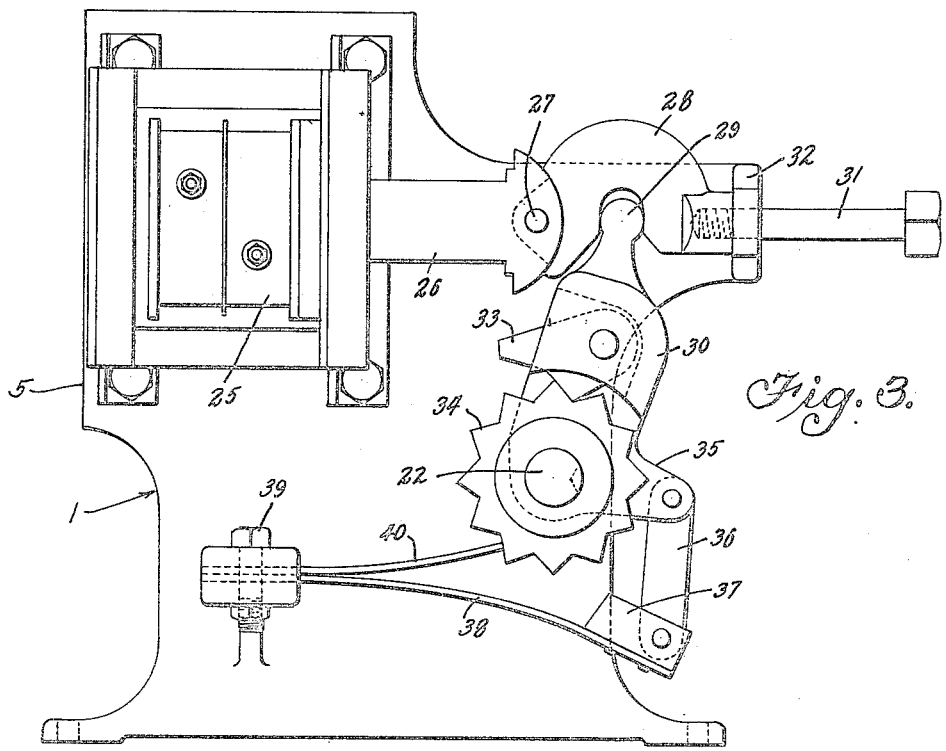
Fig. 3 is an end view of the valve mechanism shown in Fig. 1, illustrating the operation of the solenoid and ratchet mechanism.

Referring now to Fig. 3, the mechanism for successively rotating the cam shaft 22 by small increments will be described. This mechanism comprises as a driving element a solenoid 25 having a plunger 26 which is pivotally connected by a pin 27 to a yoke 28, which in turn engages with a ball 29 on the upper end of a lever 30 which is loosely mounted at its lower end upon the shaft 22, whereby it is free to oscillate about the shaft as a fulcrum.

The outer end of yoke 28 has secured thereto a guiding bolt 31 which slides in an aperture provided therefor in an extension 32 of the supporting framework. Thus it will be observed that the yoke 28 is supported for horizontal movement with the solenoid plunger 26. The lever 30 has pivoted thereto a driving pawl 33 adapted to engage with a star wheel 34 rigidly keyed to the cam shaft 22. Lever 30 is also provided with a laterally projecting arm 35 pivotally connected to a link 36 which in turn is pivotally connected at its lower end to a block 37 serving as a stop pawl. Block 37 is rigidly secured to the outer end of a spring 38 which is rigidly anchored at its opposite end to the frame of the device by a bolt 39. The bolt 39 also serves to anchor one end of a spring 40, the free end of which extends into the path of movement of the star wheel 34. Spring 40 serves to prevent rearward motion in a clockwise direction of the star wheel 34 and the block 37 functions to prevent the star wheel advancing too far when it is advanced by the driving pawl 33 in the manner next to be described.

Assuming that the solenoid 25 is not energized the plunger 26, yoke 28, lever 30 and block 37 are retracted into the position shown in Fig. 3 by the tension of the spring 38. In this position the driving pawl 33 is in engagement with a tooth of the star wheel 34 ready to advance the star wheel in a counterclockwise direction and the spring 40 is bearing against the rear face of another tooth to prevent rearward rotation of the star wheel in a clockwise direction. At the same time the block 37 is maintained clear of the star wheel. Assume now that the solenoid 25 is momentarily energized by application of electrical current thereto. This causes the solenoid to move its plunger 26 rapidly to the left while the current is applied and thereafter to be immediately restored to its normal position by the tension of the spring 38. During its movement to the left, the plunger 26, through yoke 28, shifts the lever 30 and the pawl 33 in counterclockwise direction to move the star wheel 34 through a distance equal to the pitch of its teeth. At the same time the counterclockwise rotation of lever 30 raises the arm 35 and brings the block 37 into the path of movement of the star wheel so that as the pawl 33 completes its driving movement, the block 37 is raised into a position to contact with the front face of a tooth of the star wheel and prevent the star wheel from overshooting. Of course as the star wheel is being rotated in a counterclockwise direction, the spring 40 is forced outwardly by the next tooth of the wheel and snaps back into its normal position as the movement of the wheel is completed to prevent any reversal movement thereof. As a result of the action of the spring 40 and the block 37, the star wheel is positively locked against rotation in either direction at the instant of completion of the driving movement of the pawl 33. Thereafter as the plunger 26, yoke 28 and lever 30 are restored to normal position by the spring 38, the block 37 is moved down out of engagement with the star wheel to permit the latter to be moved another notch in response to the next impulse applied to the solenoid 25.

The various cams 21 on shaft 22 are so oriented with respect to the pitch of the teeth of the star wheel 34 that upon each actuation of the solenoid 25 the cam shaft 22 is moved sufficiently to release the previously actuated valve stem 19 and depress another one. In the particular embodiment shown there are only six cams 21, whereas the star wheel 34 is provided with twelve teeth. This star wheel could therefore serve to actuate as many as eleven different valves and if desired, the number of valves may be increased beyond six by adding additional center manifold sections 4, as has been previously suggested. Obviously, however, any desired number of teeth may be provided upon the ratchet wheel 34.

In the embodiments of the valve structure so far described in connection with Figs. 1, 2 and 3, the cams 21 are shown acting directly against the push rods 19. With this arrangement, the valves can only be actuated by the cam shaft 21.

Figure 4:
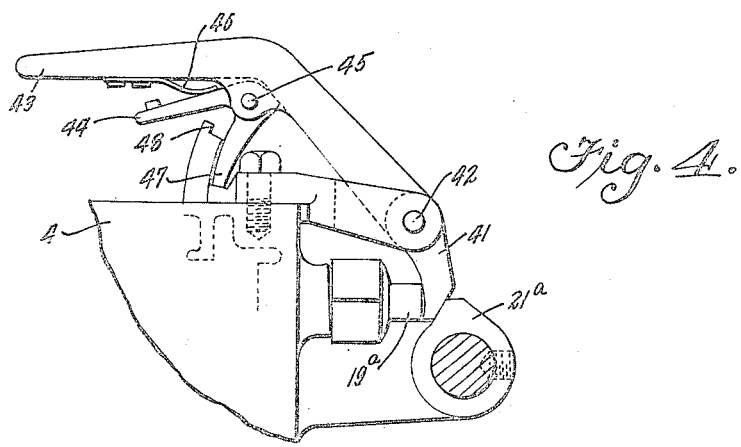
Fig. 4 is a detailed view showing an alternative valve arrangement to that shown in Fig. 2 to permit manual operation of the valve.

Referring now to Fig. 4, a variation of the structure will be described, which variation permits of independent manual operation of the valves. Thus in Fig. 4 the cam 21a instead of bearing directly against the valve stem 19a, bears against the outer face of the end of a lever 41 which is interposed between the cam and the stem 19a. Lever 41 is pivotally mounted to the frame of the valve assembly by a pivot 42 and extends upwardly and rearwardly over the top of the manifold, the rear end of the lever serving as a handle 43. By elevating the handle 43, the valve stem 19a may be depressed by the lever 41 independently of the position of the cam 21a. To lock the valve stem 19a in depressed position, a latch lever 44 is pivoted to the under side of the lever 41 as by a pin 45, which lever 44 is normally maintained in the position shown in the drawings by a spring 46. However, if the handle 43 is elevated and the lever 44 manually rotated in a clockwise direction until the lower end of arm 47 on the lever 44 engages with the stop 48 mounted upon the manifold, the handle 43 will be maintained in elevated position, thus maintaining the valve stem 19a in depressed position in which the associated valve is open.

As is apparent, the valve may be released manually at any time by slightly elevating the handle 43 to permit the spring 46 to disengage the lever arm 47 from the stop 48 and then releasing the handle 43. This manual control makes it possible to control any of the valves independently of the automatically operated cam shaft.

Figure 5:
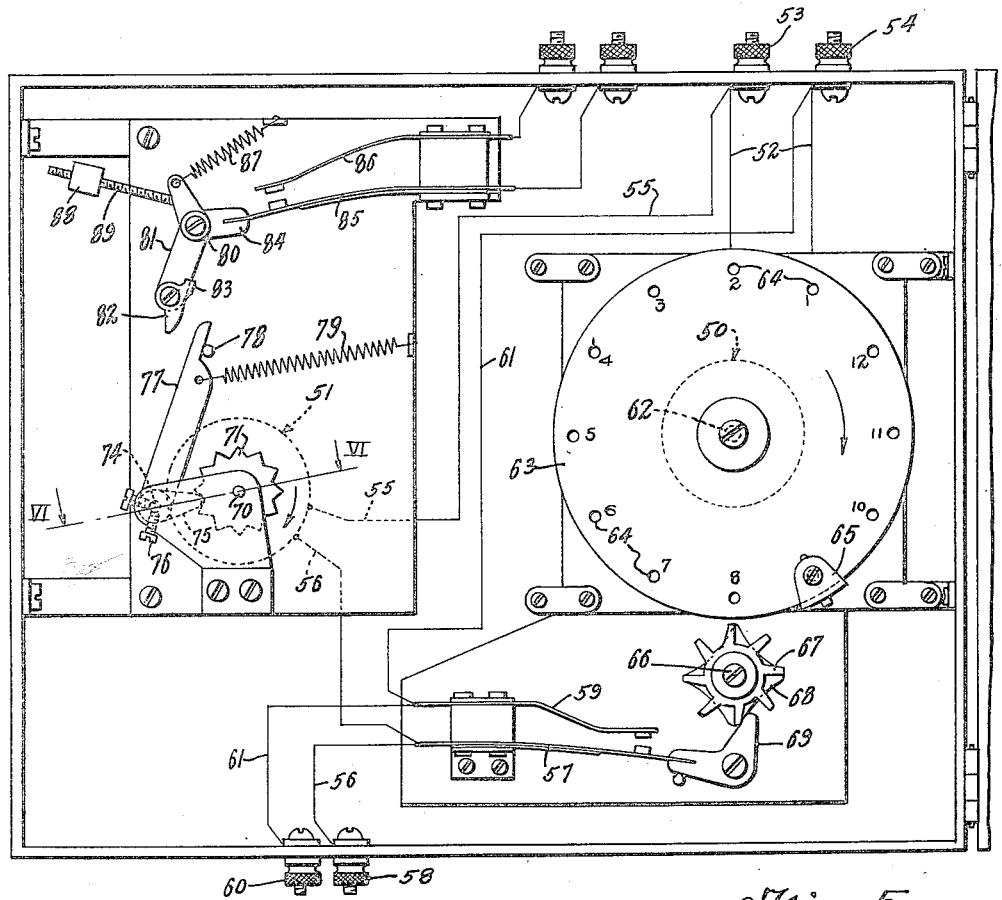
Fig. 5 is an elevational view of a clock mechanism that may be used in the system.
Figure 6:
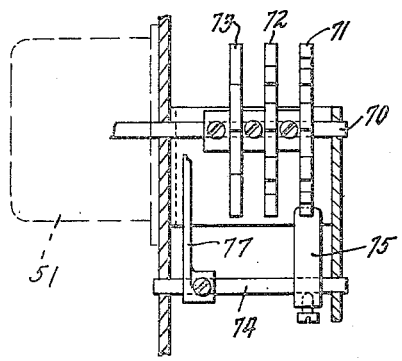
Fig. 6 is a sectional detailed view taken in the plane VI—VI of Fig. 5.

The clock mechanism which is disclosed in Figs. 5 and 6 and indicated diagrammatically at 2 in Fig. 1, is essentially a device for momentarily closing an electric circuit a plurality of times in relatively rapid succession and then maintaining them in open position for a relatively long time before again successively closing them.

The unitary assemblage shown in Fig. 5 comprises two electrical clocks 50 and 51 respectively. These clocks may be of any known type and their specific driving mechanism does not constitute a part of the present invention. The clock 50 serves as a master clock and runs continuously. To this end the wires 52 constituting its actuating circuit are permanently connected to a pair of binding posts 53 and 54 which are intended to be connected to a source of supply such as a commercial 110 volt lighting circuit. The clock 51, on the other hand (which will hereafter be referred to as the auxiliary clock) is intended to run only intermittently under the control of the master clock and of the contacts 24 on the valve unit (Fig. 1).

To this end it has one of its energizing conductors 55 connected directly to the current supply binding post 53 but has its other energizing conductor 56 connected to one contact spring 57 of a pair of contacts associated with the master clock 50 and to a binding post 58. The other contact spring 59 associated with contact spring 57 and another binding post 60 are connected directly by a conductor 61 to the other supply circuit binding post 54.

It will be observed as a result of the foregoing connections that the actuating circuit for the auxiliary clock 51 is closed only when the contact springs 57 and 59 are closed or when the binding posts 58 and 60 are connected together through an external circuit.

The master clock 50 is provided with a shaft 62 corresponding to the shaft upon which an hour hand is mounted in a conventional clock. In other words, shaft 62 makes a complete revolution every twelve hours. There is secured to shaft 62 for rotation therewith a disc 63 having twelve holes 64 symmetrically spaced about its periphery. These holes are for the purpose of securing to the disc in any one of twelve different positions a trip 65.

Positioned below the disc 63 and mounted for rotation upon a shaft 66 positioned parallel to shaft 62 is a star wheel 67 so positioned as to be in the path of movement of the trip 65, so that upon each revolution of disc 63, the trip 65 engages one of the teeth of the star wheel 67 and rotates it through a distance equal to the pitch of the star wheel teeth. Positioned back of the star wheel 67 and rigidly secured to shaft 66 is a cam 68 having several lobes, in the instance shown the number of lobes being equal to half the number of teeth on the star wheel 67. Mounted for pivotal movement adjacent the cam 68 is a cam follower 69 which is secured to the contact spring 57 so that deflection of cam follower 69 by cam 68 closes the contacts on springs 57 and 59.

Following closure of the contacts on springs 57 and 59 by the operation of the master clock 50, energizing current is supplied from binding posts 53 and 54 to the auxiliary clock 51 which thereupon begins to rotate.

Auxiliary clock 51 is provided with a shaft 70 corresponding to the minute hand shaft of a conventional clock. In other words, shaft 70 makes a complete revolution during an hour of continuous running. Fixedly secured to shaft 70 for rotation therewith are a plurality of star wheels 71, 72 and 73 (Fig. 6), these three star wheels being mounted at spaced intervals along the shaft 70. Mounted parallel to shaft 70 is a rock shaft 74, to which is secured a pawl 75 adapted to project into the path of movement of the teeth of one or the other of the star wheels 71, 72 and 73. Pawl 75 is normally secured in rigid relation to shaft 74 by a set screw 76. However, by loosening said screw 76, the pawl may be moved longitudinally along shaft 74 into cooperative position with any one of the three star wheels.

There is also secured to the rock shaft 74 an arm 77 which projects upwardly and is normally retained against a stop 78 by a spring 79, in which position the pawl 75 is in the path of movement of one of the star wheels 71, 72 and 73.

Mounted in the same plane with lever 77 but positioned thereabove is a bell crank lever 80 which has a downwardly depending arm 81 to which there is pivotally secured a latch member 82 which projects into the path of movement of the outer end of lever 77. The latch member 82 is free to rotate from the position shown in a clockwise direction but is prevented from rotating in a counterclockwise direction because of a shoulder 83 which engages with the arm 81. Bell crank lever 80 is provided with another arm 84 which is secured to the free end of a contact spring 85 which cooperates with a fixed contact spring 86. The bell crank lever 80 is normally maintained in the position shown by a spring 87 and is provided with an adjustable weight 88 on a threaded arm 89 to permit adjusting the natural period of oscillation of the bell crank lever.

The three star wheels 71, 72 and 73 may be provided with any desired number of teeth. Thus, star wheel 71 may have twelve teeth, the star wheel 72 six teeth, and the star wheel 73 four teeth.

Assuming that the auxiliary clock 51 has been set in operation by closure of the contacts 57 and 59 on the master clock and that the pawl 75 is adjusted to cooperate with the star wheel 71, rotation of the star wheel 71 in a clockwise direction gradually raises the end of pawl 75 in engagement with the wheel until the tooth in contact with the pawl passes completely thereunder; thereupon the pawl 75 is quickly snapped back against the next tooth by the spring 79. This movement of pawl 75 is transmitted through the rock shaft 74 to lever 77 so that twelve times during each revolution of the shaft 70 (every five minutes), the lever 77 is moved slowly to the left and then quickly snapped back against the pin 78 by the spring 79. During its movement to the left, the upper end of lever 77 does not shift the bell crank lever 80 because of the fact that the latch 82 is free to rotate in a clockwise direction and permit the lever 77 to swing past the lever 81. However, when the lever 77 is snapped to the right, it engages with the latch 82 and carries it to the right until the end of lever 77 slips out of engagement with the latch 82. On each counter-clockwise rotation of the bell crank lever 80, the arm 84 closes the contacts on springs 85 and 86 but maintains them closed only for a very short period, determined in the main by the tension on spring 87 and the magnitude and position of the weight 88.

It will be observed that since the closure of the contacts on springs 85 and 86 occurs only during movement of the lever 77 to the right under the influence of spring 79, it is impossible for the mechanism to become stopped or locked in a position in which the contacts on springs 85 and 86 are closed.

It will be observed that the momentary closures of the contacts on springs 85 and 86 occur as many times during an hour as there are teeth on the star wheel in engagement with the pawl 75 and that these impulses are symmetrically spaced. Therefore so long as clock 51 is running, if the pawl 75 is positioned to cooperate with star wheel 71, the contacts on springs 85 and 86 will be closed at five minute intervals. If the pawl 75 is positioned to cooperate with star wheel 72 having six teeth, the contact closures will occur at ten minute intervals, and if the pawl 75 is positioned to cooperate with star wheel 73 having four teeth, the contact closures will occur at fifteen minute intervals.

The complete system operates as follows:

Referring to Fig. 1, the solenoid 25 is connected between one side of a current supply circuit (binding post 54) and the other side of the circuit (binding post 53) through the contacts 85 and 86 of the auxiliary clock 51. The master clock 50 has its input terminals connected directly across the supply terminals 53 and 54 so that it runs continuously, and the contacts 24 on the valve unit are connected across the terminals 58 and 60. Under normal conditions, the cam shaft 22 is in such position that all of the valves are closed and the contacts 24 are open. Therefore the auxiliary clock 51 can not operate until the contacts 59 and 57 of the master clock 50 close. Now assume that it is desired to operate the sprinkler system every evening at 9:00 o'clock and accordingly the trip 65 is set in the position indicated in Fig. 5. It will be observed that since there are twice as many teeth on the star wheel 67 as there are lobes on the cam 68, the disc 63 must make two complete revolutions in order to shift the cam 68 into position to close the contacts 57 and 59. By properly setting the clock in the first place, therefore, the trip 65 will actuate the star wheel and cam to close the contacts 57 and 59 only at 9:00 o'clock every evening.

Immediately upon closure of contacts 57 and 59, energizing current is supplied thereover from the supply terminals 53 and 54 to the auxiliary clock 51 and the latter begins to run. Assuming that the pawl 75 is set to function with the star wheel 71 as shown in Fig. 6, after the auxiliary clock 51 has run for five minutes, it will have tripped the lever 77 and caused momentary closure of the contacts 85 and 86. This supplies a current pulse from the line terminals 53 and 54 to the solenoid 25, causing the latter to operate in the manner previously described, and shifting the cam shaft 22 through one-twelfth of a revolution, or sufficient to close the contacts 24 and open one of the six valves. Closure of contacts 24 is necessary for the reason that the contacts 57 and 59 on the master clock are maintained in closed condition for only a short period and if contacts 24 were not provided, the auxiliary clock 51 would stop running as soon as contacts 57 and 59 reopened.

At five minute intervals, the auxiliary clock 51 will momentarily close the contacts 85 and 86 to deliver single electrical impulses to the solenoid 25 and upon each actuation of the solenoid the cam shaft 22 is shifted through one-eleventh of a revolution to close the valve last open, and open a new valve. Thus with the setting shown water will be supplied successively for five minute intervals to each of the six sprinkler supply lines 12. Obviously, as has been previously mentioned, the valve may be increased in size to supply ten different sprinkler lines instead of six, if desired.

When the cam shaft 22 has been rotated through a complete revolution, it is again in its position of rest, in which all the valves are closed and in which the contacts 24 are open. Opening of contacts 24 opens the power supply to the auxiliary clock 51 and the latter thereupon stops and remains inactive until the contacts 57 and 59 of the master clock again close at 9:00 o'clock the next evening.

Obviously, by varying the shape of the cam 68 on the master clock, the intervals between successive operations of the auxiliary clock 51 may be varied. Thus, if the cam 68 has the same number of lobes as the star wheel 67 has teeth, the auxiliary clock will be started every twelve hours. On the other hand, if the lobes of the cam 68 are reduced to two and the same number of teeth left on the star wheel 67 (eight), then the auxiliary clock will be started only every forty-eight hours.

Likewise, if it is desired to supply water to each sprinkler line for ten minutes instead of five, the pawl 75 may be shifted along the rock shaft 74 into position to engage with the star wheel 72, or if it is desired to sprinkle for a fifteen minute period, the pawl 75 will be moved into position to engage with the star wheel 73. More than three star wheels may be provided if desired, or the number of teeth on each wheel may be different from the number shown.

Although the system described has been mentioned as being particularly applicable to the control of sprinkler systems, it is to be understood that it is not limited to this use. It may be equally useful in irrigation systems in which water is periodically supplied to different areas, or it may be used in industries where it is desirable to periodically supply fluids for a predetermined, accurately regulated, length of time. The invention is therefore to be limited only as set forth in the appended claims.

We claim:

1. In a fluid flow control system, a plurality of valves for supplying fluid to different lines, a shaft mounted for rotation and having means associated therewith for opening different valves in different positions of rotation of the shaft, said shaft having at least one predetermined position in which all of said valves are closed, a first pair of normally open contacts, means associated with said shaft for closing said contacts when said shaft is in all positions except said predetermined position in which all of said valves are closed, electrically actuated means for rotating said shaft from one of said positions to the next succeeding position in response to application of an electrical impulse thereto, an operating circuit for said electrically actuated means, an electrically operated timing device having a pair of normally open contacts in the operating circuit of said electrically actuated means, said device when it is running periodically momentarily closing its contacts to deliver, on each closure, a single operating impulse to said electrically actuated means at predetermined relatively short time intervals, auxiliary switch means, and circuit means for energizing said timing device including said first pair of contacts and said auxiliary switch means in parallel, whereby said timing device may be started by closure of said auxiliary switch means and thereafter maintained in operation by current received over said first pair of contacts until said shaft reaches said predetermined position and opens said first pair of contacts.

2. In a fluid flow control system, a plurality of valves for supplying fluid to different lines, a shaft mounted for rotation and having means associated therewith for opening different valves in different positions of rotation of the shaft, said shaft having at least one predetermined position in which all of said valves are closed, a first pair of normally closed contacts, means associated with said shaft for opening said contacts only when said shaft is in said predetermined position in which all of said valves are closed, electrically actuated means for rotating said shaft from one of said positions to the next succeeding position in response to application of an electrical impulse thereto, an operating circuit for said electrically actuated means, an electrically operated timing device having a pair of normally open contacts in the operating circuit of said electrically actuated means, said device when it is running periodically momentarily closing its contacts to deliver operating impulses to said electrically actuated means at predetermined relatively short time intervals, a master clock having a pair of contacts and a mechanism for closing them periodically at relatively long intervals and maintaining them closed for at least one of said short time intervals, circuit means for energizing said timing device including said first pair of contacts and contacts of said master clock in parallel, whereby said timing device is started in response to closure of the contacts of the master clock and thereafter continues to run from current received over said first pair of contacts after the master clock contacts have been opened, until the first pair of contacts are again opened by movement of said shaft into one of said predetermined positions.

3. In a fluid flow control system, a plurality of valves for supplying fluid to different lines, a shaft mounted for rotation and having means associated therewith for opening different valves in different positions of rotation of the shaft, said shaft having at least one predetermined position in which all of said valves are closed, a first pair of contacts, means associated with said shaft for closing said contacts when said shaft is in all positions except said predetermined position, a solenoid and mechanism associated therewith for rotating said shaft from one of said positions to the next succeeding position in response to application of an electric impulse to said solenoid, an operating circuit for said solenoid, an electrically operated timing device having a pair of contacts in said operating circuit, said timing device including mechanism for periodically momentarily closing its contacts when said timing device is energized, an energizing circuit for said timing device, said circuit including said first pair of contacts for maintaining said timing device energized at all times when said shaft is out of said predetermined position, and a pair of master contacts connected in parallel to said first pair of contacts for starting said timing device when the shaft is in said predetermined position.

4. In a fluid flow control system, a plurality of valves for supplying fluid to different lines, a shaft mounted for rotation and having means associated therewith for opening different ones of said valves in different positions of rotation of the shaft, said shaft having at least one predetermined position in which all of said valves are closed, a solenoid and mechanism associated therewith for rotating said shaft from any one of said positions to the next succeeding position in response to application to said solenoid of a single electric impulse, an energizing circuit for said solenoid including a first pair of contacts, motor means and mechanism driven thereby for periodically momentarily closing said first pair of contacts to deliver current impulses to said solenoid at predetermined intervals during operation of said motor means, a control circuit for said motor means including a second pair of contacts, and means associated with said shaft for closing said second pair of contacts when said shaft is in all positions except said predetermined position, whereby said shaft will be automatically intermittently rotated through its successive different positions after initial rotation from said predetermined position into the next position thereafter, and means for producing initial energization of said solenoid to rotate said shaft from said predetermined position into the next position thereafter.

COLONEL J. WILLIAMSON.
HERBERT F. SUVERKRUP.